Dec. 1, 1959                R. F. FOSTER                 2,915,325
                         SEPARABLE COUPLINGS
Filed April 30, 1954                                  2 Sheets-Sheet 1

INVENTOR.
Robert F. Foster
BY
*[signature]*
ATTORNEY

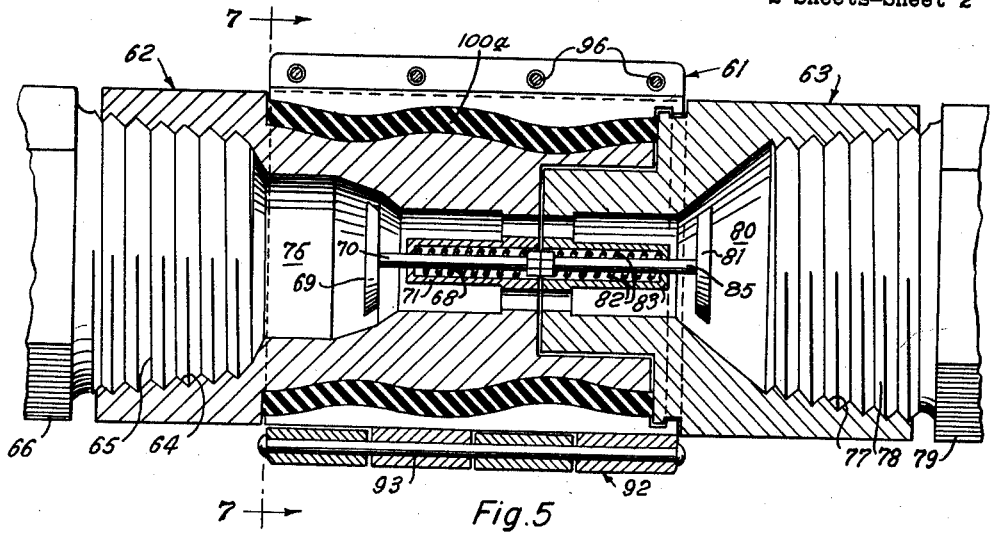
Fig. 5
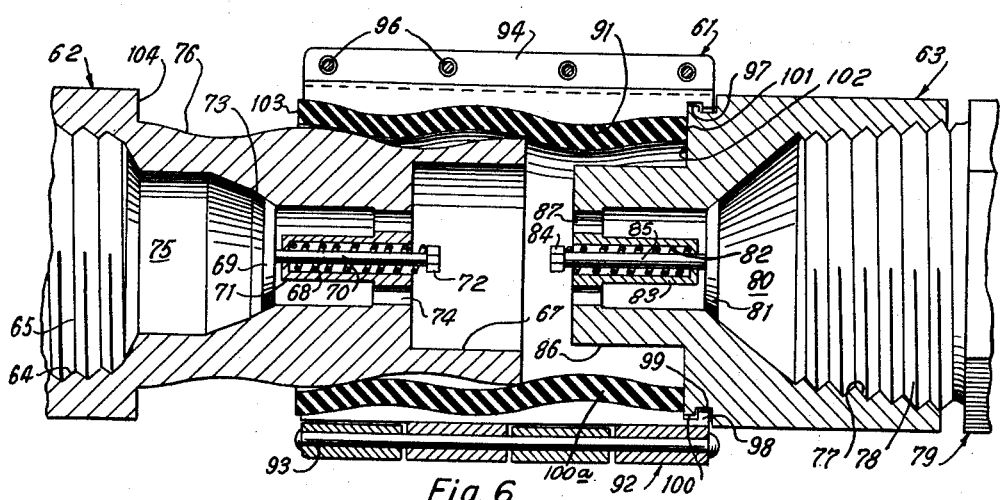
Fig. 6
Fig. 7
Fig. 8
INVENTOR.
Robert F. Foster
BY
ATTORNEY

United States Patent Office 2,915,325
Patented Dec. 1, 1959

2,915,325

SEPARABLE COUPLINGS

Robert F. Foster, Dallas, Tex., assignor to Lone Star Gas Company, Dallas, Tex., a corporation of Texas Application April 30, 1954, Serial No. 426,759

8 Claims. (Cl. 285—276)

This invention relates to separable couplings and more particularly separable couplings having valve means for automatically closing both sections of the coupling upon their separation.

Separable couplings are generally employed for connecting two sections of hose, pipe or other conduit to effect transmission of fluid from one reservoir to another. For example, butane gas is generally transported by means of a mobile truck mounted tank to fixed tanks which are sometimes buried underground. When the mobile tank is at the location of such a fixed tank, the outlet hose of the mobile tank must be connected to the inlet pipe of the fixed tank by a suitable separable coupling whose matching sections are secured to the outlet hose and inlet pipe, respectively. Such separable couplings should preferably permit automatic separation of their sections when a predetermined force is exerted thereon, in order to prevent rupture of or damage to the pipe or hose, since the truck drivers sometimes forget to separate the couplings before driving the truck away from the location of the fixed tank. Moreover such separable couplings should be provided with valve means in both sections for automatically closing the inlet pipe and outlet hose when the coupling sections are separated and which automatically open to permit flow through the inlet pipe and outlet hose when the sections are joined. Further, such separable sections should be protected from introduction of foreign matter into the sections and should be provided with means which prevent communication of the interior of the hose and pipe with the atmosphere while the sections are being joined or separated.

Accordingly, it is an object of the invention to provide a new and improved separable coupling for conduits of various types such as pipe or hose.

Another object of the invention is to provide a separable coupling, of the type described, having two separable sections each provided with an automatically operated valve which opens when the two sections are joined and which closes when the two sections are separated.

Still another object of the invention is to provide a separable coupling, of the type described, having means for holding the two sections together which are protected from foreign matter.

A further object of the invention is to provide a separable coupling, of the type described, having means for preventing communication between the conduits to which the coupling sections are fixed and the atmosphere during the joining and separation of the coupling sections.

A still further object of the invention is to provide a separable coupling, of the type described, having means for holding the two sections against separation with a predetermined force, but permitting automatic separation upon application of a separating force in excess of such predetermined holding force.

Additional objects and advantages of the invention will be readily apparent from the reading of the following description of devices constructed in accordance with the invention and reference to the accompanying drawings thereof, wherein:

Figure 5 is a sectional view of another form of the separable coupling showing the two coupling sections joined together;

Figure 6 is a sectional view of the coupling illustrated in Figure 5 showing the two sections as they appear while being separated;

Figure 7 is a sectional view taken on line 7—7 of Figure 5; and,

Figure 8 is a perspective view of a pressure adjusting bar usable with the coupling shown in Figures 5 to 7.

Figure 1:
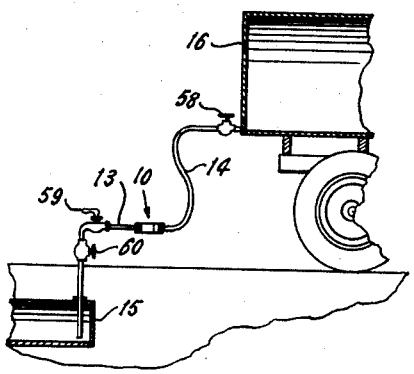
Figure 1 is a fragmentary schematic view, partly in elevation and partly in section, showing the outlet hose of a mobile tank connected to the inlet pipe of a fixed tank by a separable coupling.
Figure 2:
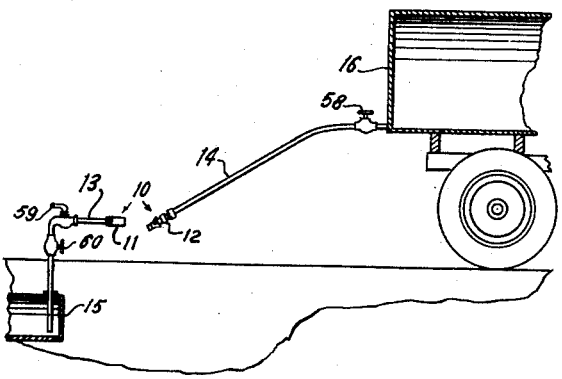
Figure 2 is a view similar to Figure 1 showing the coupling separated as the mobile tank moves away from the fixed tank.
Figure 3:
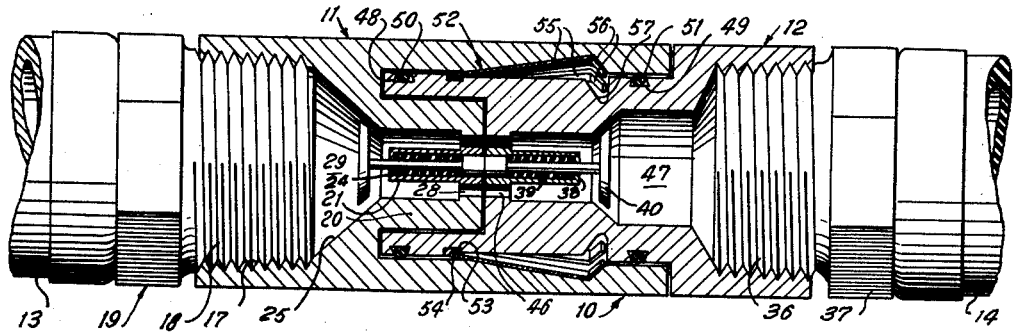
Figure 3 is a sectional view of a preferred form of the separable coupling showing the two coupling sections joined together.
Figure 4:
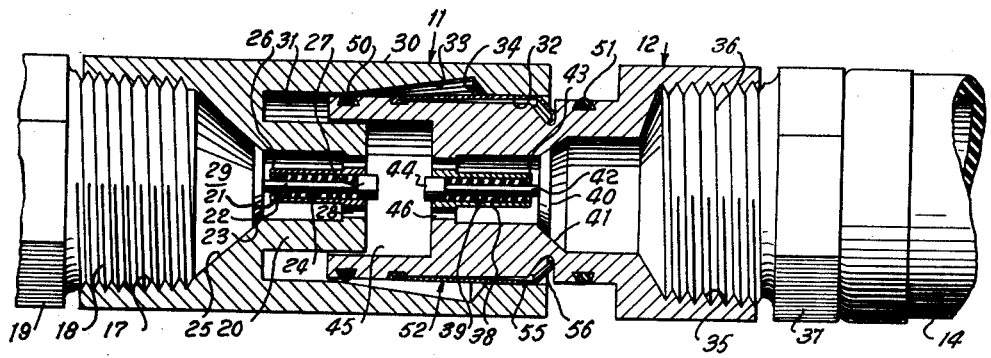
Figure 4 is a sectional view of the coupling illustrated in Figure 3 showing the two sections as they appear while being separated.

Referring now particularly to Figures 1 to 4 of the drawings, the separable coupling 10 includes a female section 11 and a male section 12 which may be connected to the inlet pipe 13 and the outlet hose 14, respectively, of a fixed tank 15 and a mobile tank 16, respectively.

The female section 11 is internally threaded, as at 17, to receive the externally threaded end 18 of a fitting 19 which is connected to the end of the inlet pipe 13. The female section 11 has an internal tubular projection or snout 20 which in turn has a valve spring housing 21 through which extends the stem 22 of a valve 23. A helical spring 24 is disposed about the valve stem in the housing 21 to bias the valve 23 to closed position on the valve seat 25 provided by a beveled internal surface in the bore of the female section 11. Two valve spring has opposite ends which abut an inturned annular flange 26 of the housing 21 and an external annular shoulder of the spring retaining nut 27 of the valve stem. The retaining nut may be threaded on the valve stem and provided with a cylindrical outer surface to enter into the tubular housing. A plurality of apertures or ports 28 are provided in the end of the snout 20 which communicate with the internal flow passage or bore 29 of the female section.

The outer sleeve portion 30 of the female section 11 is spaced outwardly of and projects or extends forwardly beyond the end of the snout 20. The sleeve portion has a pair of sealing surfaces 31 and 32 spaced longitudinally in the bore of said sleeve portion so as to be disposed on opposite sides of an internal annular groove having a forwardly flared annular surface 33 and a forwardly and inwardly convergent annular camming surface 34 in said sleeve portion.

The male section 12 of the coupling 10 is also internally threaded, as at 35, to receive the externally threaded end 36 of a fitting 37 which is connected to the end of the outlet hose 14 of the mobile tank. The male section is also provided with a valve spring housing 38 in which is disposed a helical spring 39 which biases a valve 40 toward closed position on the seat surface 41 in the bore of said male section. The stem 42 of the valve extends through the spring housing 38 and the valve spring 39, and said valve spring bears against the annular flange 43 of the spring housing and a nut 44 threaded on the valve stem to bias the valve to closed position.

The forward end of the male section 12 is provided with an enlarged bore or internal recess 45 which is adapted to receive the snout 20 of the female section when the male section is inserted into the female section. A plurality of apertures 46 communicate with the recess 45 and the internal flow passage or bore 47 of the male section.

The outer surface of the male section is provided with a pair of longitudinally spaced external annular grooves 48 and 49 in which are disposed O-rings or seals 50 and 51, respectively, which contact the sealing surfaces 31 and 32, respectively, of the outer sleeve portion 30 of the female section when the two sections are joined, whereby said seals and surfaces prevent passage of fluids through the small annular space between the male section and the outer sleeve portion.

A retaining member 52 is mounted on the male section. The retaining member includes a rigid annular member or ring 53 which is disposed in an external annular recess 54 in the male section adjacent the groove 48 at its outer end. The ring 53 may be of a resilient substance such as spring steel and split to facilitate its insertion into the recess 54. A plurality of resilient fingers or prongs 55 extend rearwardly and outwardly from the ring 53, and the outer ends of the prongs are bent inwardly and rearwardly to provide camming portions 56. It will be apparent that when the two sections 11 and 12 of the couplings are joined, the fingers are disposed in the internal annular recess of the sleeve section 30 of the female section with the camming portions 56 abutting the annular camming surface 34 of the groove. The male section is also provided with an annular recess 57 which is adapted to receive the camming portions 56 of the prongs 55 when the prongs are bent inwardly on the male section.

In use, when it is desired to transfer fluid from the mobile tank 16 to the fixed tank 15, the inlet pipe 13 and the outlet hose 14 are joined or connected by inserting the male section 12 into the female section 11. The valves 23 and 40 are normally in closed positions closing the inlet pipe and the outlet hose, respectively. As the male section is inserted into the female section, the prongs 55 first contact the female section and are yieldingly bent inwardly. Then the O-rings 50 and 51 contact their sealing surfaces 31 and 32, respectively, and seal between the male and female sections before the valves 23 and 40 open. Continued insertion of the male section in the female section will now cause the nuts 27 and 44 of the valve stems 22 and 42, respectively, to contact each other and cause the valves to move to open positions. The flow passages 47 and 29 of the two sections are now connected and fluid may flow from the flow passage or bore 47 of the section connected to the hose to the flow passage or bore 29 of the section connected to the pipe past the open valves. The valve 58 of the mobile tank 16 and the valves 59 and 60 of the fixed tank are then opened to transfer fluid from the mobile tank to the fixed tank. The fluid in the mobile tank may be a gas under pressure, such as butane gas, or may be a liquid to be pumped through the outlet hose. In any case, the pressure differential between the interior and exterior of the coupling sections tends to move the sections apart. Such movement is resisted by the resilient prongs 55 whose camming portions 56 bear against the camming surface 34 and thus resist outward movement of the male section from the female section.

If the tank driver now forgets to uncouple the outlet hose from the inlet pipe before moving the mobile tank, a force is exerted on the male section 12 which tends to move it out of the female section 11. When this force attains a predetermined value, the camming action between the camming portions 56 of the prongs and the camming surface 34 of the female section causes the prongs to move inwardly and the male section moves outwardly from the female section. The O-rings continue to seal between the male and female sections to prevent communication between the atmosphere and the flow passages 29 and 47 during outward movement of the male section until the two valves 23 and 40 move to fully closed positions. This sealing action of the O-rings prevents escape of fluid from the tanks during uncoupling of the inlet pipe and the outlet hose. As the truck continues to move, the male section then separates from the female section.

It will now be apparent that a new and improved coupling has been illustrated and described which includes a male section 12 and a female section 11 which are provided with a retaining means, the resilient prongs 55, which tend to hold the two sections against separation from each other until a predetermined separating force is applied to the coupling. It will also be apparent that the valves 23 and 40 automatically open and close the inlet pipe and outlet hose as the two sections are joined and separated, respectively. Furthermore, it will be seen that the sealing or O-rings prevent communication between the atmosphere and the flow passages 29 and 47 of the female and male sections during joining and separation of the two sections, and that the seal is maintained at all times that the valves are open.

In Figures 5 to 8 is shown a modified form of the separable coupling wherein the coupling 61 includes a male section 62 which may be connected to the inlet pipe of a fixed tank and a female section 63 which may be connected to the outlet hose of a mobile tank.

The male section 62 is internally threaded as at 64 to receive the externally threaded end 65 of a fitting 66 which is on the inlet pipe. The forward end of the male section is provided with an enlarged bore or recess 67 into which extends the valve stem 68 of a valve 69 when the valve is in closed position. The valve is biased toward closed position by a spring 70 confined in a spring housing 71 and which bears against a nut 72 on the outer end of the valve stem. The male section has a valve seat 73 in its bore 75 and a plurality of ports 74 provide communication between the flow passage or bore 75 and the recess 67 when the valve 69 is open. The outer surface of the male section is provided with annular corrugations or grooves 76 for a purpose to be hereinafter described.

The female section 63 of the coupling 61 is internally threaded, as at 77, to receive the externally threaded end 78 of a fitting 79 which is on the outlet hose. The bore or flow passage 80 of the female section is adapted to be closed by a valve 81 which is biased toward closed position by a spring 82 confined in a housing 83 in the female section. The spring bears against the nut 84 on the stem 85 of the valve. The female section 63 has a reduced portion or snout 86 arranged to enter the enlarged bore 67 of the male section and is provided with ports 87 which communicate with the bore or flow passage 80 when the valve 81 is open.

The female section is provided with a clamp 88 having two halves 89 and 90 whose inner surfaces are provided with corrugations or grooves 91 which correspond to the corrugations 76 on the outer surface of the male section. The two halves of the clamp are connected at one side by a hinge 92 having a hinge pin 93. Opposed upstanding flanges 94 and 95 are provided on the sides of the clamp halves opposite the hinge 92, and these flanges are releasably and adjustably connected by screws 96 which extend through suitable apertures in the flange 94 into threaded bores in the flange 95.

The clamp halves are provided at their inner ends with internal grooves 97 which define internal flanges 98 at such end adapted to engage with a complementary external groove 99 and flange 100 on the body portion of the female section to secure the clamp to the female section.

A friction and compression member 100a, which may be of rubber or other resilient substance, is disposed in the clamp to be engaged between the corrugated surfaces 76 and 91. It will be apparent that the resilient friction and compression member will yield to permit the corrugated forward portion 76 of the male section to be inserted into the sleeve and clamp. As the snout 86 of the female section enters the recess 67 of the male section, the valve stems touch and open the valves 69 and 81. As the corrugated forward portion 76 of the male section is inserted into the sleeve, the sleeve seals between said corrugated forward portion and the clamp. At the same time, the inner end 101 of the sleeve abuts the annular shoulder 102 of the body portion of the female section so that there is no communication between the atmosphere and the flow passages or bores 75 and 80 of the two sections while the two sections are being coupled and uncoupled. As a result, no fluid can escape from these flow passages during coupling or uncoupling operations while the valves are open. When the two sections are fully coupled, the outer end 103 of the sleeve bears against the annular shoulder 104 of the male section to provide an even better seal.

It will be apparent that, as in the previously described coupling, the valves 69 and 81 open and close automatically as the two sections are coupled and uncoupled and that when the valves are open fluid may flow between the two pasages past the valves 69 and 81 and through the ports 74 and 87. Likewise, when the valves are open the sleeve seals between the sections to prevent escape of fluids from within the coupling, hose or pipe.

The amount of force which must be exerted to uncouple the two sections 62 and 63 may be varied by rotating the screws 96. Thus, if the pressure differential between the inside and outside of the two sections is quite high, the screws 96 are rotated to bring the clamp halves 89 and 90 closer together and thus insure that a greater friction will exist between the two sections to further resist uncoupling forces on the two sections. If a lesser pressure differential exists, an adjusting or spacer bar 105 may be inserted between the flanges 94 and 95 of the clamp halves to limit the degree to which the clamp halves may be moved toward each other. The spacer bar is provided with holes 106 through which the screws 96 may pass.

It will be seen that two forms of a new and improved coupling have been illustrated and described, each of which is provided with automatically operating valves which are fully enclosed when the coupling sections are coupled and are thus protected against damage. It will also be apparent that each of the couplings is provided with a resilient member which holds the two sections of the coupling together and that a predetermined uncouplings force must be exerted before the resilient member yields to allow uncoupling of the two sections. Moreover, it will be apparent that each of the couplings is provided with a sealing means which prevents communication between the atmosphere and the flow passages of the two sections of the coupling while the valves therein are open during coupling and uncoupling operations.

The foregoing description of the invention is explanatory only, and changes in the details of the construction illustrated may be made by those skilled in the art, within the scope of the appended claims, without departing from the spirit of the invention.

What I claim and desire to secure by Letters Patent is:

1. A coupling comprising: a female section; a male section insertable in the female section; said female section having an inner surface and said male section having an outer surface disposed adjacent each other when the male section is inserted in said female section in coupled relation; each of said sections having an internal flow passage communicating with the flow passage of the other section when in coupled relation; cooperating retaining means including groove means in each said inner surface of said female section and said outer surface of said male section, and resilent interlocking means disposed between said inner and outer surfaces and resiliently engaging said groove means in said surfaces when the male section is inserted in said female section to resiliently detachably hold said sections together in coupled relation; and seal means disposed between the outer surface of said male section and the inner surface of said female section and sealingly engaging the adjacent portions of each of said surfaces when the sections are coupled together to completely enclose said retaining means and prevent passage of fluids between said surfaces past said retaining means and to prevent access of foreign matter to said retaining means.

2. A coupling comprising: a female section; a male section insertable in the female section; said female section having an inner surface and said male section having an outer surface disposed adjacent each other when the male section is inserted in said female section in coupled relation; each of said sections having an internal flow passage communicating with the flow passage of the other section when in coupled relation; cooperating retaining means including groove means in each said inner surface of said female section and said outer surface of said male section, and resilient interlocking means disposed between said inner and outer surfaces and resiliently engaging said groove means in said surfaces when the male section is inserted in said female section to resiliently detachably hold said sections together in coupled relation; first seal means disposed adjacent the outer end of the inner surface of said female section and the inner end of the outer surface of said male section and sealingly engaging the adjacent surfaces of both said male and female sections when said male section is inserted in said female section in coupled relation; and second seal means disposed adjacent the inner end of the inner surface of said female section and the outer end of the outer surface of said male section and sealingly engaging the adjacent surfaces of both said male and female sections when said male section is inserted in said female section in coupled relation; said seal means being disposed on opposite sides of said retaining means when the sections are coupled and preventing passage of fluids between said surfaces of said sections and past said retaining means, and also preventing access of foreign matter to said retaining means.

3. A coupling comprising: a female section; a male section insertable in the female section, each of said sections having a flow passage; and cooperating retaining means on said sections for detachably holding said sections together in coupled relation, said retaining means including a plurality of resilient prongs on said male section biased outwardly, said female section having an internal annular groove for receiving said prongs, said groove having a camming surface and said prongs having camming portions contacting said camming surfaces when said sections are coupled, the camming action between said camming surface and said camming portions moving said prongs inwardly out of said groove to permit uncoupling of said sections when a predetermined uncoupling force is applied to said sections, said male section having an external annular groove for receiving said camming portions of said prongs, said female section having sealing surfaces on opposite sides of said internal annular groove, said male section having sealing means on either side of said prongs for engaging said sealing surfaces to prevent communication between the atmosphere and said flow passages and also for preventing access of foreign matter to said retaining means.

4. A coupling comprising: a female section; a male section insertable in the female section, each of said sections having a flow passage; cooperating retaining means on said sections for detachably holding said sections together in coupled relation, said retaining means including a plurality of resilient prongs on one of said sections biased toward the other of said sections, the other of said sections having a groove for receiving said prongs, said groove having a camming surface and said prongs having camming portions whereby camming action between said prongs and said camming surface will move said prongs out of said groove to permit uncoupling of said sections when a predetermined uncoupling force is applied to said sections; seal means engaging both said male section and said female section when the same are in coupled relation to prevent access of foreign matter from both interiorly and exteriorly of the coupling to said retaining means, whereby proper functioning of said retaining means will not be affected by foreign matter and to prevent communication between the atmosphere and said flow passages.

5. A coupling comprising: a first section; a second section removably telescoped in the first section, each of said sections having a flow passage; and cooperating retaining means on said sections for detachably holding said sections together in coupled relation, said retaining means comprising a clamp on said first section, and a resilient sleeve in said clamp, said second section having a portion removably telescoped in said sleeve, said portion and said clamp having corresponding registering corrugations; said corrugations being elements of said retaining means, portions of the resilient sleeve constituting seal means disposed between said first and second sections to prevent access of foreign matter from exteriorly of said coupling into the coupling.

6. A coupling comprising: a first section; a second section removably telescoped in the first section, each of said seconds having a flow passage; and cooperating retaining means on said sections for detachably holding said sections together in coupled relation, said retaining means comprising a clamp on said first section, and a resilient sleeve in said clamp, said second section having a portion removably telescoped in said sleeve, said portion and said clamp having corresponding registering corrugations, said corrugations being elements of the retaining means, said clamp having two halves hingedly connected on one pair of adjacent sides and means at the other pair of adjacent sides for adjusting the position of said clamp halves with respect to one another; portions of the resilient sleeve constituting seal means disposed between said first and second sections to prevent access of foreign matter from exteriorly of said coupling into said coupling.

7. A coupling comprising: a first section; a second section removably telescoped in the first section, each of said sections having a flow passage; and cooperating retaining means on said sections for detachably holding said sections together in coupled relation, said retaining means comprising a clamp on said first section, and a resilient sleeve in said clamp, said second section having a portion removably telescoped in said sleeve, said portion and said clamp having corresponding registering corrugations, said corrugations being elements of said retaining means, said clamp having two halves hingedly connected at one pair of adjacent sides, the other pair of adjacent sides having upstanding opposed flanges, and means connecting said flanges for moving said flanges toward and away from one another; portions of the resilient sleeve constituting seal means disposed between said first and second sections to prevent access of foreign matter from exteriorly of the coupling into said coupling.

8. A coupling comprising: a first section; a second section removably telescoped in the first section, each of said sections having a flow passage; and cooperating retaining means on said sections for detachably holding said sections together in coupled relation, said retaining means comprising a clamp on said first section, and a resilient sleeve in said clamp, said second section having a portion removably telescoped in said sleeve, said portion and said clamp having corresponding registering corrugations, said corrugations being elements of said retaining means, said clamp having two halves hingedly connected at one pair of adjacent sides, the other pair of adjacent sides upstanding opposed flanges, means connecting said flanges for moving said flanges toward and away from one another, and an adjusting bar between said flanges for limiting movement of said flanges toward one another; portions of the resilient sleeve constituting seal means between said first and second sections to prevent access to foreign matter from exteriorly of said coupling into said coupling.

References Cited in the file of this patent:

UNITED STATES PATENTS

| Re. 23,365 | Stranberg | May 15, 1951 |
| 115,917 | Wharton | June 13, 1871 |
| 166,489 | Westinghouse | Aug. 10, 1875 |
| 1,328,488 | Bowden | Jan. 20, 1920 |
| 2,179,854 | Latham et al. | Nov. 14, 1939 |
| 2,238,706 | Ohls | Apr. 15, 1941 |
| 2,299,193 | Trautman | Oct. 20, 1942 |
| 2,406,662 | Burchett | Aug. 27, 1946 |
| 2,453,480 | Williamson et al. | Nov. 9, 1948 |
| 2,453,741 | Bopp | Nov. 16, 1948 |
| 2,648,553 | Ulrich | Aug. 11, 1953 |
| 2,665,928 | Omon et al. | Jan. 12, 1954 |

FOREIGN PATENTS

| 111,541 | Great Britain | Dec. 5, 1917 |
| 768,040 | France | May 7, 1934 |